United States Patent [19]

Kiyoshima

[11] Patent Number: 4,596,273
[45] Date of Patent: Jun. 24, 1986

[54] DOUBLE-SEAT ELECTROMAGNETIC VALVE

[75] Inventor: Shuji Kiyoshima, Higashimatsuyama, Japan

[73] Assignee: Diesel Kiki Co., Ltd., Tokyo, Japan

[21] Appl. No.: 722,303

[22] Filed: Apr. 11, 1985

[51] Int. Cl.[4] .............................................. F15B 13/044
[52] U.S. Cl. .................. 137/625.65; 137/625.5
[58] Field of Search ............... 137/625.65; 251/129, 251/129.14

[56] References Cited

U.S. PATENT DOCUMENTS

| | | | |
|---|---|---|---|
| 3,395,890 | 8/1968 | Eckert | 137/625.65 X |
| 3,732,893 | 5/1973 | Ziesche et al. | 137/625.65 |
| 3,878,859 | 4/1975 | Grob et al. | 251/129 X |

FOREIGN PATENT DOCUMENTS

| | | | |
|---|---|---|---|
| 2046153 | 3/1972 | Fed. Rep. of Germany | 137/625.65 |
| 2124484 | 11/1972 | Fed. Rep. of Germany | 137/625.65 |
| 1216389 | 4/1960 | France | 137/625.65 |
| 10371 | 3/1974 | Japan. | |
| 842238 | 7/1960 | United Kingdom | 137/625.65 |

Primary Examiner—Gerald A. Michalsky
Attorney, Agent, or Firm—Frishauf, Holtz, Goodman & Woodward

[57] ABSTRACT

A double-seat electromagnetic valve in which the valve body is adapted to selectively assume a first seated position wherein the pressure medium-feeding port is closed and the load-connecting port is communicated with the tank port, and a second seated position wherein the tank port is closed and the load-connecting port is communicated with the pressure medium-feeding port. A valve spring permanently urges the valve body toward one of the first and second seated positions. A control plunger is actuatable by an electromagnetic force to urge the valve body toward the other of the first and second seated positions, against the force of the valve spring.

7 Claims, 2 Drawing Figures

DOUBLE-SEAT ELECTROMAGNETIC VALVE

BACKGROUND OF THE INVENTION

This invention relates to a double-seat electromagnetic valve which is simple in structure and excellent in oiltightness.

A double-seat electromagnetic valve is known e.g. by Japanese Patent Publication No. 49-10371, which comprises a control plunger arranged in a valve casing, and a valve body displaceable in response to the control plunger and being disposed to selectively assume a first seated position wherein a pressure medium-feeding port is connected to a load-connecting port, and a second seated position wherein the load-connecting port is connected to a reservoir port connected to a return passage.

According to this conventional electromagnetic valve, operating fluid pressure acts upon the valve body interposed between two opposite valve seats at its one side directly, and at its other side via the control plunger, at the same time in such a manner that the two operating fluid pressures are equilibrated with each other. In an embodiment of the conventional electromagnetic valve, a weak spring is used to urge the valve body to close a valve bore. The valve can thus be closed and opened with high responsiveness.

With this arrangement, however, a passageway has to be formed in the valve casing to feed the operating fluid to the control plunger. Furthermore, high oiltightness has to be provided between a cavity within which the control plunger is arranged and which is supplied with the operating fluid under a high pressure, and the aforementioned return passage in which the operating fluid under a low pressure flows. A partition member, which separates the cavity and the return passage from each other, however, is formed therein with a through hole which is penetrated by a push rod secured to the control plunger and urging the valve body to displace same. Since the push rod should smoothly move in the partition member, the machining operation has to be performed with high precision accuracy so as to satisfy both of the requirements of oiltightness and smooth movement of the push rod.

SUMMARY OF THE INVENTION

It is an object of the invention to provide a double-seat electromagnetic valve which is simple in structure, and excellent in oiltightness without requiring strict machining tolerances, and can be compact in size, easy to assemble, and suitable for mass production.

It is a further object of the invention to provide a double-seat electromagnetic valve which has high responsiveness in the opening and closing action of the valve body.

It is another object of the invention to provide a double-seat electromagnetic valve in which the operating fluid undergoes small flow resistance in returning from the load-connecting port to the reservoir port, thereby having a small pressure loss coefficient.

The present invention provides a double-seat electromagnetic valve which includes a first port adapted to be supplied with a pressure medium, a second port adapted to be connected to a load, a third port for returning the pressure medium, and a valve body adapted to selectively assume a first seated position wherein the first port is closed and the second port is communicated with the third port, and a second seated position wherein the third port is closed and the second port is communicated with the first port. The double-seat electromagnetic valve according to the invention is characterized by a valve spring permanently urging the valve body toward the first seated position, a control plunger actuatable by an electromagnetic force to urge the valve body toward the second seated position, against the force of the valve spring, and a plunger spring urging the control plunger toward the valve body, said valve spring having an urging force for urging the valve body, the urging force of the valve spring being set at a value slightly larger than the sum of a pressure force of the pressure medium acting upon the valve body and a force of the plunger spring urging the control plunger.

The above and other objects, features, and advantages of the invention will be more apparent from the ensuing detailed description taken in conjunction with the accompanying drawings.

DETAILED DESCRIPTION

The invention will now be described in detail with reference to the drawings illustrating an embodiment thereof.

Figure 1:
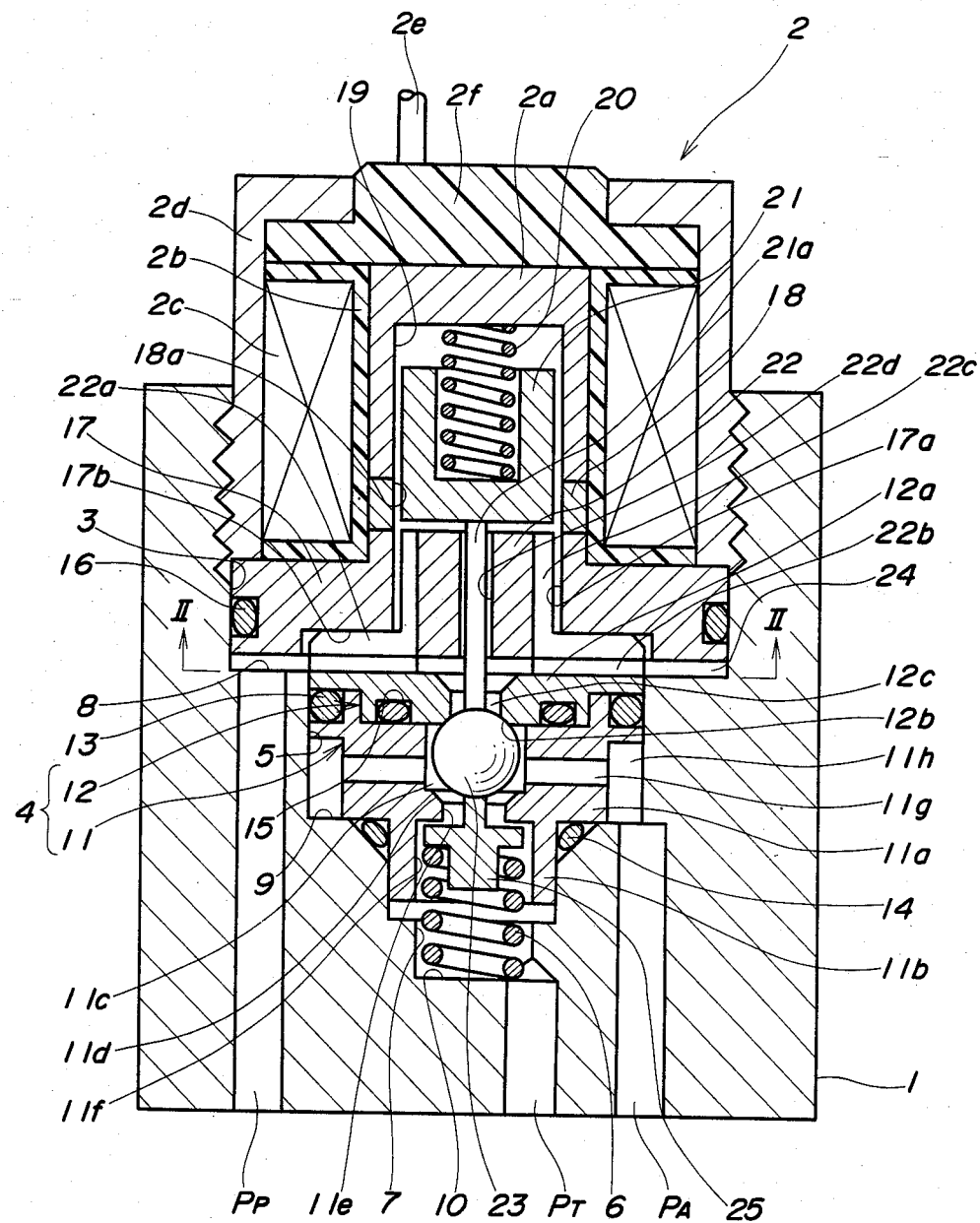
FIG. 1 is a longitudinal sectional view of a double-seat electromagnetic valve according to an embodiment of the invention.

In FIG. 1, reference numeral 1 designates a cylindrical valve casing which has its interior formed with three axial holes 3, 5 and 7 with different diameters continuously arranged along the axis of the casing 1, with stepped shoulders 8 and 9 intervening therebetween. The large-sized hole 3 opens in an end face of the casing 1 and has a screw-threaded inner peripheral surface and holds a solenoid assembly 2 threadedly fitted therein. The intermediate medium-sized hole 5 accommodates a valve seat block 4, while the small-sized hole 7 is a blind hole and accommodates a valve spring 6. Three ports $P_P$, $P_A$ and $P_T$ are formed in the valve casing 1, of which the P-port $P_P$ terminates at one end in a radial face of the first stepped shoulder 8 located between the holes 3 and 5, the A-port $P_A$ in a radial face of the second stepped shoulder 9 located between the holes 5 and 7, and the T-port $P_T$ in a bottom face 10 of the hole 7, respectively. The ports $P_P$, $P_A$, $P_T$ extend axially of the valve casing, and all open at the other ends in the other end face of the valve casing 1. The P-port $P_P$ is adapted to be connected to a pressure fluid source, e.g. a fluid pump, not shown, the A-port $P_A$ to an actuator as a load, not shown, and the T-port $P_T$ to a fluid tank, not shown, respectively.

The valve seat block 4 is formed of a first valve seat member 11 on the side of the T-port $P_T$, and a second valve seat member 12 on the side of the P-port $P_P$. The first valve seat member 11 has a disc-shaped portion 11a fitted in the medium-sized hole 5, and a boss portion 11b fitted in the small-sized hole 7. A valve chamber 11c, a valve bore 11e which has an annnular valve seat 11d defined at an end edge thereof, and a central hole 11f in the boss portion 11b are formed along the axis of the member 11 and arranged continuously in the order mentioned. Radial passages 11g are formed in the disc-shaped portion 11a of the valve seat member 11 to communicate the valve chamber 11c with an annular groove 11h formed in the outer peripheral wall of the disc-shaped portion 11a. The second valve seat member 12 is formed of a disc-shaped member 12a fitted in the medium-sized hole 5 and formed along its axis with an axial hole 12c as a second valve bore which has an annular valve seat 12b at an end edge thereof facing toward the valve seat 11d. The valve seat 11d on the side of the T-port $P_T$ has a diameter somewhat larger than that of the valve seat 12b on the side of the P-port $P_P$.

The first valve seat member 11 is fitted within the medium-sized hole 5 and the small-sized hole 7 with O-rings 13 and 14 interposed between the member 11 and the respective holes 5, 7. The second valve seat member 12 has an end face thereof disposed in face-to-face contact with an end face of the first valve seat member 11 with an O-ring 15 interposed therebetween.

The solenoid assembly 2 comprises an iron core 2a, and a coil 2c wound around a bobbin 2b fitted around the iron core 2a, the iron core 2a, the coil 2c and the bobbin 2b being accommodated within a cylindrical housing 2d with an open end threadedly fitted in the tapped large-sized hole 3 in the valve casing 1. A lead wire 2e of the coil 2c extends outwardly through an insulating material 2f fitted in an opening in the bottom of the housing 2d. An annular magnetic member 17 is fitted in the large-sized hole 3 in the valve casing 1 via an O-ring 16 fitted in the outer peripheral surface of the member 17 and held in place by the open end of the housing 2d threadedly fitted in the large-sized hole 3. The magnetic member 17 is joined to the iron core 2a via an annular non-magnetic member 18 which shuts off the magnetic line of force.

The iron core 2a has a central blind hole 19 formed therein and opening in an end face thereof facing toward the valve seat block 4. The blind hole 19 is aligned with through holes 18a and 17a formed, respectively, in the non-magnetic member 18 and the magnetic member 17, along their axes, and having the same diameter as the hole 19, to define a continuous hollow cavity in cooperation with the holes 18a, 17a.

An end face of the magnetic member 17 facing toward the valve seat block 4 is formed therein with a recess 17b having a diameter nearly equal to the outer diameter of the valve seat block 4. Accommodated within the cavity 19, 18a, 17a are a control plunger 21 urged toward the magnetic member 17 by a plunger spring 20 and slidable within the cavity, and a magnetic pole 22 formed of a magnetic material and having a flange 22a fitted in the recess 17b. The control plunger 21 has a plunger rod 21a slidably extending through a central hole 22d axially formed through the magnetic pole 22 and disposed in permanent urging contact with a valve body 23 in the form of a ball, in such a manner that it urges with a small force the valve body 23 toward the first valve seat member 11d when the coil 2c of the solenoid assembly 2 is deenergized.

Figure 2:
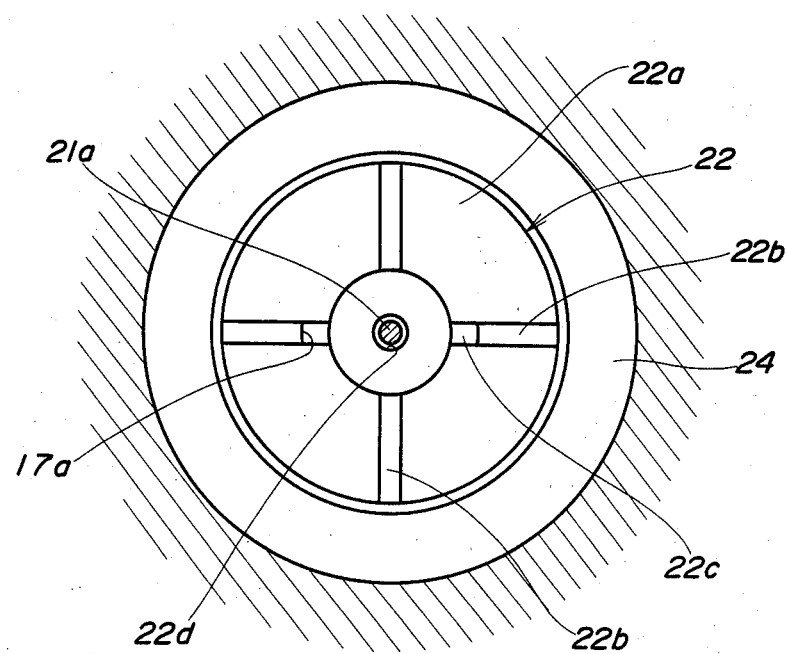
FIG. 2 is an end view taken along line II—II in FIG. 1.

The solenoid housing 2d threadedly fitted in the large-sized hole 3 in the valve casing 1 holds the flange 22a of the magnetic pole 22 in face-to-face contact with the first valve seat member 12 such that the first and second valve seat members 11, 12 are combined together in one piece and in an oiltight manner. The valve seat 12b of the second valve seat member 12 is disposed opposite the valve seat 11d of the first valve seat member 11 via the valve chamber 11c defined therebetween. The valve body or ball 23 fitted in the valve chamber 11c is freely axially movable through a small stroke between the two opposite valve seats 12b, 11d. The valve bore 12c in the second valve seat member 12 communicates with the P-port $P_P$ by way of two pairs of radial grooves 22b formed in an end face of the flange 22a of the magnetic pole 22 in face-to-face contact with the second valve seat member 12 and arranged in a cruciform array as shown in FIG. 2, and an annular space 24 defined between the outer periphery of the flange 22a, a lower end of the magnetic member 17 and the first stepped shoulder 8 in the valve casing 1. The valve chamber 11c communicates with the A-port $P_A$ by way of the aforementioned radial passages 11g, and the annular groove 11h defined around the first valve seat member 11. The valve bore 11e in the first valve seat member 11 communicates with the T-port $P_T$ by way of the central hole 11f in the boss 11b and the small-sized hole 7. Axial grooves 22c are formed in the outer periphery of the magnetic pole 22 to allow pressurized operating fluid to flow from the P-port $P_P$ to the control plunger 21 for smooth movement of the latter. On the other hand, in the illustrated position the valve spring 6 accommodated within the small-sized hole 7 in the valve casing 1 urgingly biases the valve body 23 off the valve seat 11d and holds it in contact with the valve seat 12b through a spring seat 25 and against the force of the plunger spring 20. The gap between the opposed end faces of the control plunger 21 and the magnetic pole 22 assumed in the illustrated position is set at a value slightly larger than the stroke of free movement of the valve body 23 between the opposite valve seats 11d, 12b.

The force F1 of the valve spring 6 is set at a value slightly larger than the sum of the pressure force F2 of the operating fluid from the P-port $P_P$ acting upon the ball valve body 23 through the valve bore 12c and the force F3 of the plunger spring 20 (F1 > F2 + F3). Further, the force F1 of the valve spring 6 is set such that when the magnetic pole 22 is energized to generate a magnetic force F4, the relationship F1 < F2 + F3 + F4 stands.

The operation of the double-seat electromagnetic valve constructed as above will now be described.

When the coil 2c of the solenoid assembly 2 is in a deenergized state, the valve spring 6 urgingly holds the valve body 23 against the valve seat 12b against the sum of the pressure force of the operating fluid acting upon the valve body 23 through the valve bore 12c and the force of the plunger spring 20 whereby the valve bore 12c on the side of the P-port $P_P$ is closed while the valve bore 11e on the side of the T-port $P_T$ is opened and accordingly the ports $P_A$, $P_T$ are communicated with each other, thereby connecting the actuator to the fluid tank.

When the coil 2c is energized, the magnetic pole 22 is excited to magnetically attract the control plunger 22 toward itself so that the plunger rod 21a pushes the ball valve body 23 away from the valve seat 12b and into a position seated against the other valve seat 11d to close the valve bore 11e and simultaneously open the valve bore 12c whereby the ports $P_P$, $P_A$ are communicated with each other. Thus, the operating fluid from the P-port $P_P$ is allowed to flow to the actuator through the A-port $P_A$. On this occasion, the relationship of forces acting upon the valve body 23 instantly changes between F1 > F2 + F3 and F1 < F2 + F2 + F3 + F4 in response to generation and extinction of the magnetic force F4 of the magnetic pole 22, causing the valve body 23 to close and open the valve bore 12c in a positive and instant manner, thus imparting high responsiveness to the valve.

As set forth above, the double-seat electromagnetic valve according to the invention has no high pressure fluid passageway formed in the valve casing for guiding operating fluid for equilibrated supporting of the valve body, and the magnetic pole 22 has its opposite sides acted upon by high pressure operating fluid alone. Therefore, the valve can be simple in structure, compact in size, and can be assembled with ease and produced on a mass production basis, without requiring high precision machining operation. Furthermore, since the diameter of one of the opposite valve seats, e.g. the valve seat 11d, is set slightly larger than the diameter of the other valve seat 12c, the operating fluid can undergo lesser flow resistance in returning from the actuator to the fluid tank when the valve body 23 opens the valve bore 11e, resulting in reduced pressure loss.

Variations to the described and illustrated embodiment will occur to those skilled in art within the scope of the present inventive concepts which are delineated by the following claims.

What is claimed is:

1. A double-seat electromagnetic valve comprising:
   a valve casing having first port adapted to be supplied with a pressure medium; a second port adapted to be connected to a load; and a third port for returning the pressure medium;
   a valve body in said valve casing and adapted to selectively assume a first seated position wherein said first port is closed and said second port is communicated with said third port, and a second seated position wherein said third port is closed and said second port is communicated with said first port;
   a valve spring chamber in said valve casing and permanently communicating only with said third port;
   a valve spring in said valve spring chamber and permanently urging said valve body toward said first seated position;
   a first valve bore communicating with said first port, said first valve bore having an end edge thereof provided with a first valve seat on which said valve body is to be seated when it assumes said first seated position; and a second valve bore communicating with said third port, said second valve bore having an end edge thereof provided with a second valve seat on which said valve body is to be seated when it assumes said second seated position; said first and second valve seats being disposed opposite each other; and said valve body being interposed between said first and second valve seats;
   a control plunger actuatable by an electromagnetic force to urge said valve body toward said second seated position, against the force of said valve spring;
   passage means coupled to said first port for always supplying pressure medium from said first port to only one end of said valve body through said first valve bore so that said pressure medium acts on only said one end of said valve body; and
   a plunger spring urging said control plunger toward said valve body;
   said valve spring having a urging force for urging said valve body, said urging force of said valve spring being set at a value slightly larger than the sum of pressure force of said pressure medium acting upon said valve body through said first valve bore and a force of said plunger spring urging said control plunger.

2. A double-seat electromagnetic valve as claimed in claim 1, wherein said second valve seat has a diameter larger than that of said first valve seat.

3. A double-seat electromagnetic valve as claimed in claim 1, including solenoid means for imparting said electromagnetic force to said control plunger for urging said valve body, said urging force of said valve spring being set at a value smaller than the sum of said pressure force of said pressure medium acting upon said valve body through said first valve bore, said force of said plunger spring urging said control plunger, and said electromagnetic force.

4. A double-seat electromagnetic valve as claimed in claim 1, including:
   a valve seat member in which at least said first valve bore is formed;
   solenoid means for imparting said electromagnetic force to said control plunger for urging said valve body, said solenoid means having a magnetic pole disposed in face-to-face contact with said valve seat member;
   cruciform passage means formed in said magnetic pole disposed in face-to-face contact with said valve seat member at a side thereof remote from said valve body, said cruciform passage means being between said magnetic pole and said valve seat member; and
   an annular space defined around said cruciform passage means;
   said first valve bore communicating with said first port by way of said cruciform passage means and said annular space. .

5. A double-seat electromagnetic valve as claimed in claim 1, including solenoid means for imparting said electromagnetic force to said control plunger for urging said valve body, said solenoid means having a magnetic pole interposed between said control plunger and said valve body, said control plunger having a plunger rod slidably extending through said magnetic pole and disposed to urge said valve body.

6. A double-seat electromagnetic valve as claimed in claim 5, wherein said magnetic pole has passage means for feeding part of the pressure medium from said first port to said control plunger.

7. A double-seat electromagnetic valve as claimed in claim 1, wherein said valve spring chamber comprises a small sized hole in said valve casing.

* * * * *